United States Patent [19]

Sasaki

[11] Patent Number: 4,873,535

[45] Date of Patent: Oct. 10, 1989

[54] METHOD OF DRIVING THERMAL HEAD

[75] Inventor: Eiichi Sasaki, Sagamihara, Japan

[73] Assignee: Ricoh Company, Ltd., Tokyo, Japan

[21] Appl. No.: 196,428

[22] Filed: May 20, 1988

[30] Foreign Application Priority Data

May 25, 1987 [JP] Japan ............................ 62-127438

[51] Int. Cl.[4] ........................................ G01D 15/10

[52] U.S. Cl. ............................. 346/1.1; 346/76 PH

[58] Field of Search ........................ 346/1.1, 76 PH

[56] References Cited

U.S. PATENT DOCUMENTS 4,141,018 2/1979 Mizuguchi et al. ............ 346/76 R 4,560,988 12/1985 Moriguchi et al. ................ 346/1.1

4,621,271 12/1986 Brownstein .................. 346/76 PH

FOREIGN PATENT DOCUMENTS 61-230466 10/1986 Japan ................................ 400/120

*Primary Examiner*—H. Broome
*Assistant Examiner*—Gerald L. Preston
*Attorney, Agent, or Firm*—Oblon, Spivak, McClelland, Maier & Neustadt

[57] ABSTRACT

A driving method for a thermal head which has a plurality of thermal resistance elements arranged in a line. The thermal resistance elements are electrically separated into first and second blocks. Then, a heat pulse is applied to all the necessary thermal resistance elements in the first block. Next, a heat pulse is applied to all the necessary thermal resistance elements in the second block. These applying operation are alternately repeated in sequence until the required density is obtained.

3 Claims, 4 Drawing Sheets

METHOD OF DRIVING THERMAL HEAD

BACKGROUND OF THE INVENTION

The present invention relates to a method of driving a thermal head used in a printing device for printing letters, images and the like.

There has been known a printing device which has a thermal head constituted by a plurality of thermal resistance elements arranged in a line, and controls the number of heating pulses to be applied to each of the thermal resistance elements, thereby controlling the density of the picture element corresponding to each of the thermal resistance elements in response to the number of the pulses.

According to such printing apparatus, the printing for one line by the thermal head is carried out as follows. The thermal resistance elements for one line are electrically separated into two blocks in the middle. First, all pulses corresponding to the densities are applied for one block, then all pulses corresponding to the densities are applied for the other block. More specifically, assuming that the numbers of pulses corresponding the lowest and the highest densities are "0" and "64", respectively, the pulses of at most "64" are applied to the thermal resistance elements of the first block to perform the printing for this first block, thereafter the printing for the second block is performed.

In the conventional method performing the printing for the second block after completion of all printing for the first block, the temperature of the thermal resistance element at the boundary portion between the first and second blocks becomes higher than that at the other portion, resulting in the inconvenience that the density of the picture element at this boundary becomes higher than that at the other portion.

SUMMARY OF THE INVENTION

An object of the present invention is, therefore, to provide a novel driving method of the thermal head capable of effectively reducing the patch of the printing image density due to the temperature distribution variation of the thermal head.

According to the present invention, the above object can be achieved by a method of driving a thermal head in a printing device, the thermal head having a plurality of thermal resistance elements arranged in one line, each of the thermal resistance elements being energized by heating pulses the number of which is controlled in accordance with the required density of the corresponding picture element, the method comprising the steps of: electrically separating the thermal resistance elements into first and second blocks; simultaneously applying a heating pulse to all the necessary thermal resistance elements separated in the first block; simultaneously applying a heating pulse to all the necessary thermal resistance elements separated in the second block; and alternately repeating the applying steps in sequence until the respective numbers of the heating pulses are applied to each of the thermal resistance elements so as to obtain the required density.

Preferably, the above repeating step comprises a step of repeating the applying steps in sequence by a predetermined number corresponding to the maximum density for printing.

The above separating step may comprise a step of electrically separating the thermal resistance elements into a first block composed of the thermal resistance elements arranged in odd numbers and a second block composed of the thermal resistance elements arranged in even numbers, or may comprise a step of electrically separating the thermal resistance elements in the middle of the arrangement of said thermal resistance elements into first and second blocks.

According to the above-mentioned constitution of the present invention, there causes no excessive temperature distribution variation in the longitudinal direction of the thermal head, resulting in effective reduction of the patch of the printing image density due to the temperature distribution variation.

Further objects and advantages of the present invention will be apparent from the following description, reference being had to the accompanying drawings wherein preferred embodiments of the present invention are clearly shown.

BRIEF DESCRIPTION OF THE INVENTION

DETAILED DESCRIPTION OF THE PREFERRED EMBODIMENTS

Figure 1:
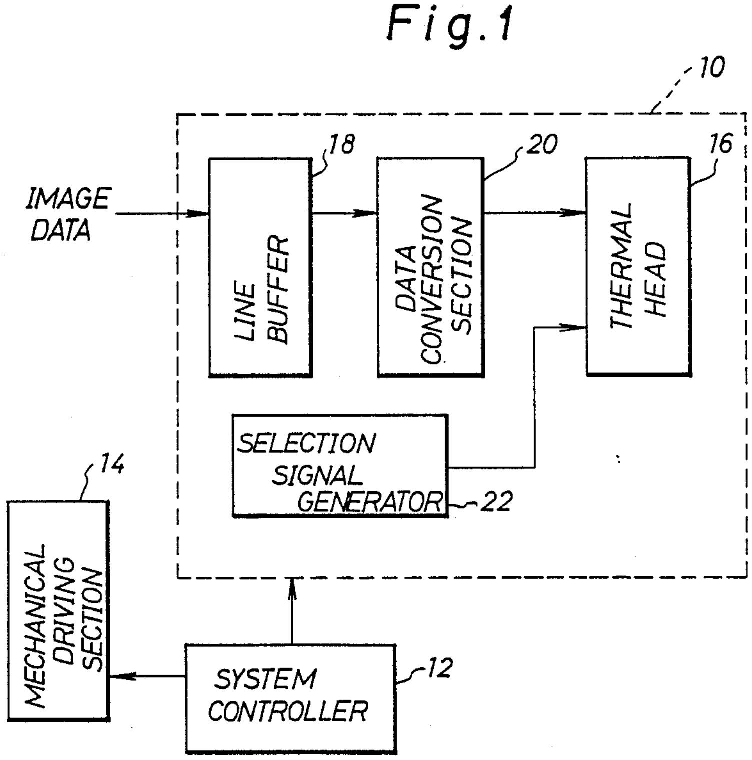
FIG. 1 shows a block diagram representing a construction of the printing apparatus according to an embodiment of the present invention.

FIG. 1 represents a summarized construction of the printing apparatus according to an embodiment of the present invention. As shown in the drawing, the whole of printing apparatus is controlled by a system controller 12. A mechanical driving section 14, controlled by the system controller 12, moves the platen (not shown) and drives a thermal head 16 to contact with and to separate from the recording paper. Image data for one line fed from a host computer or other apparatus are received by and temporarily stored in a line buffer 18. The data for one line stored in the line buffer 18 is shown, for instance, in the left end portion of FIG. 3.

The stored data in the line buffer 18 is sent to a data conversion section 20 in response to an activating signal from the system controller 12. The line buffer 18 receives and stores the image data for the next one line.

Figure 3:
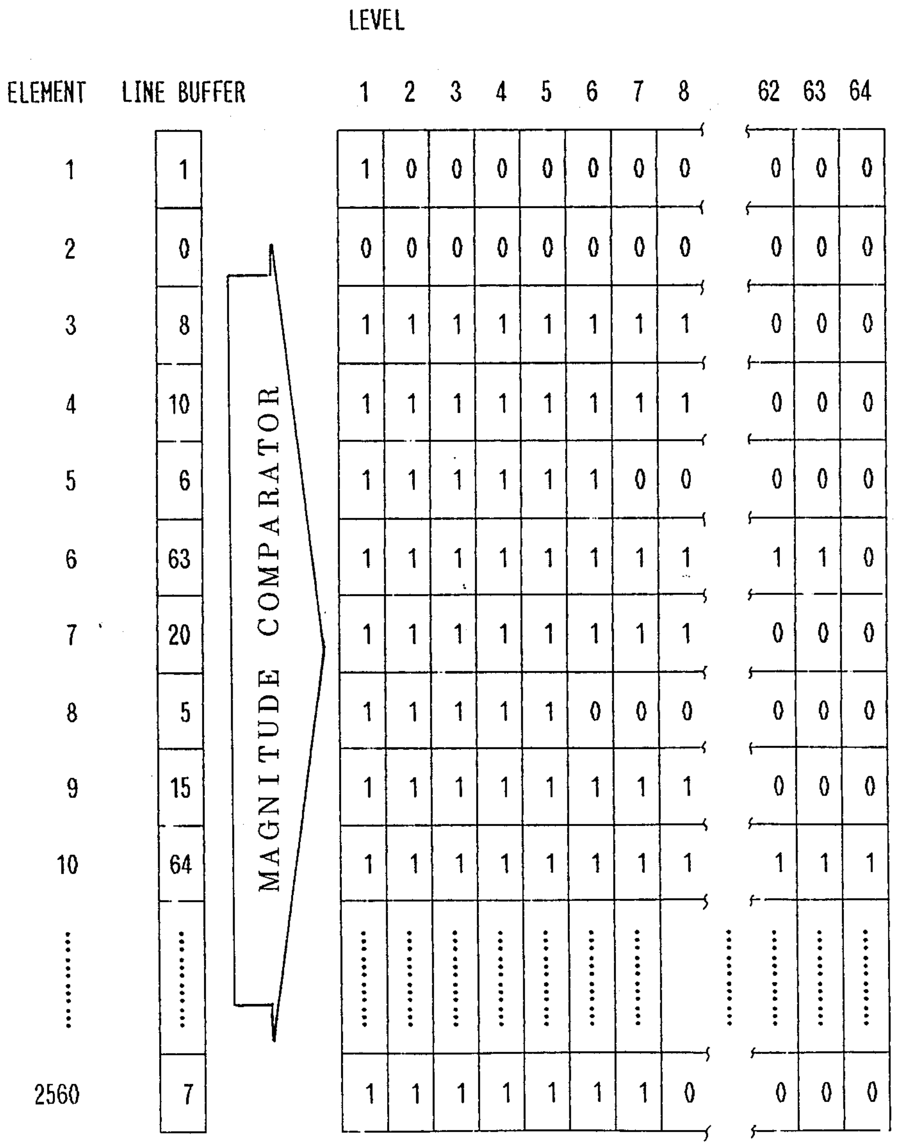
FIG. 3 shows a drawing for explaining the operations of a line buffer and a data conversion section in the embodiment of FIG. 1.

The data conversion section 20 converts the image data for one line fed thereto into the density levels of "64" levels. FIG. 3 illustrates the operation of the data conversion section for converting the image data into the density levels. The line buffer 18 includes memory elements of "2560" for storing the respective densities of "2560" picture elements, as shown in FIG. 3. The numeral in each of the divisions of the line buffer 18 indicates the density of the read-out picture element by the corresponding element. In other words, in FIG. 3, the line buffer 18 stores the information about the densities of the picture elements of "2560" which are obtained by dividing the original image for one line through the line of elements. The picture density is read out with being classified into "65" steps from "0" to "64" in this drawing. Thus stored picture density information of "2560" picture elements in the line buffer 18 is then subjected to the density level conversion by the data conversion section 20 comprising a magnitude comparator.

In FIG. 3, "level" means each of these density levels. The magnitude comparator first sets the reference levels at "1" and digitizes the respective picture element densities stored in the line buffer 18. More particularly, the digitization is performed by determining the picture element density "0" as "0" and the density larger than or equal to "1" as "1". The vertical column of the divisions on the left end of the right side in FIG. 3 indicates thus obtained result and is called a level "1" on the density level. Next, the magnitude comparator sets the reference level at "2" and determines the picture element density larger than or equal to "2" as "1" and the density smaller than or equal to "1" as "0" for the digitization, thereby obtaining a level "2". In similar manner, the digitization is performed with increasing the reference level of the magnitude comparator by "1" for obtaining the levels "3" through "64".

Figure 2:
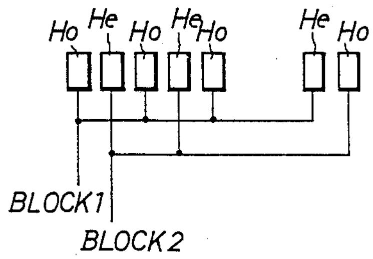
FIG. 2 shows a constructional view representing connections in the thermal head portion in the embodiment of FIG. 1.

Although the thermal head 16 comprises the thermal resistance elements of the number of "2560" arranged in a line direction in this embodiment, the number of the thermal resistance elements is not limited to "2560". The whole of the thermal resistance elements are separated into two blocks. As shown in FIG. 2, the block 1 comprises the thermal resistance elements "Ho" arranged at the odd numbers, while the block 2, the thermal resistance elements "He" are arranged at the even numbers.

Figure 4:
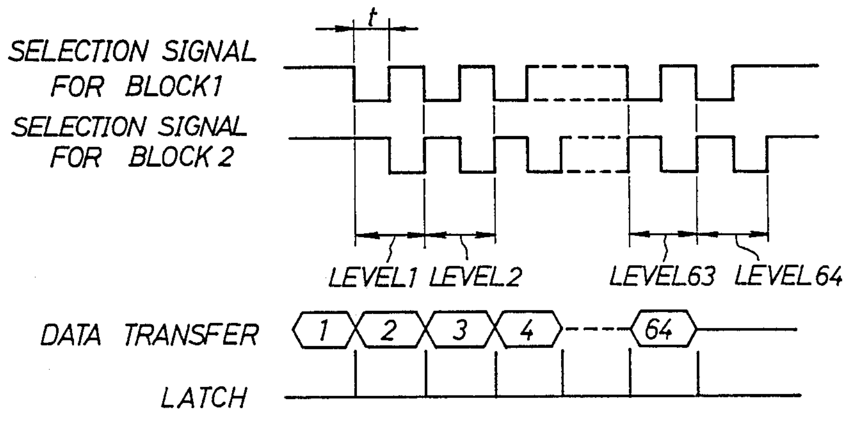
FIG. 4 shows a timing chart for explaining the operation of the embodiment of FIG. 1.

FIG. 4 is a timing chart for explaining the operation of this embodiment. The top and the second top waveforms in this drawing respectively represent selection signals for the blocks 1 and 2 fed from a selection signal generator 22. When the selection signal for the block 1 becomes low state, the thermal resistance elements of the block 1 become the state capable of printing. Similarly, when the selection signal for the block 2 becomes low state, the thermal resistance elements of the block 2 become the state capable of printing. The density levels of "1" to "64" obtained in the data conversion section 20 are succeedingly transferred by one level to the thermal head 16 and latched responsive to the one level transfer to perform the printing as shown in the third and fourth top waveforms of FIG. 4.

The selection signals for the blocks 1 and 2 have periods each equal to the data transfer period and are alternatively reversed with the phase difference $\pi$ there between. Namely, the selection signal for the block 1 becomes "low" during the first half of the printing for the level "1", while the selection signal for the block 2 becomes "low" during the second half thereof. Accordingly, for the printing by the thermal head 16, the printing for the level "1" is performed through the block 1 of the thermal resistance elements of the odd numbers, and thereafter through the block 2 of the thermal resistance elements of the even numbers. Subsequently, the printing for the level "2" are performed in the order of the blocks 1 and 2. The printings for the levels "3" through "64" are repeatedly performed in the order of the blocks 1 and 2 for each level in the similar manner. After this one line printing, the similar printing for the next one line is performed. This operation is repeated to obtain the desired printed image. More specifically, since the pulses are applied to the thermal resistance elements corresponding to the picture elements having the data content "1" for each of the density levels, the heating pulses of j are applied to the thermal resistance element for the printing of the picture element having the density level j (j=0 through 64). Taking into account that the density of the picture element of the image to be recorded is approximately proportional to the number of the heating pulses, it becomes possible to obtain the recording picture element density corresponding to the original picture element density.

Figure 5:
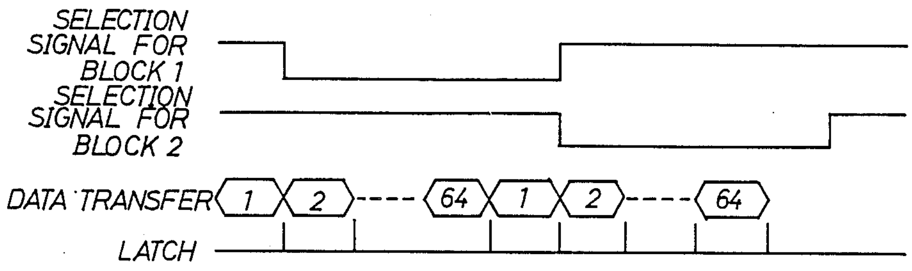
FIG. 5 shows a timing chart for explaining the operation of the conventional technique.
Figure 6:
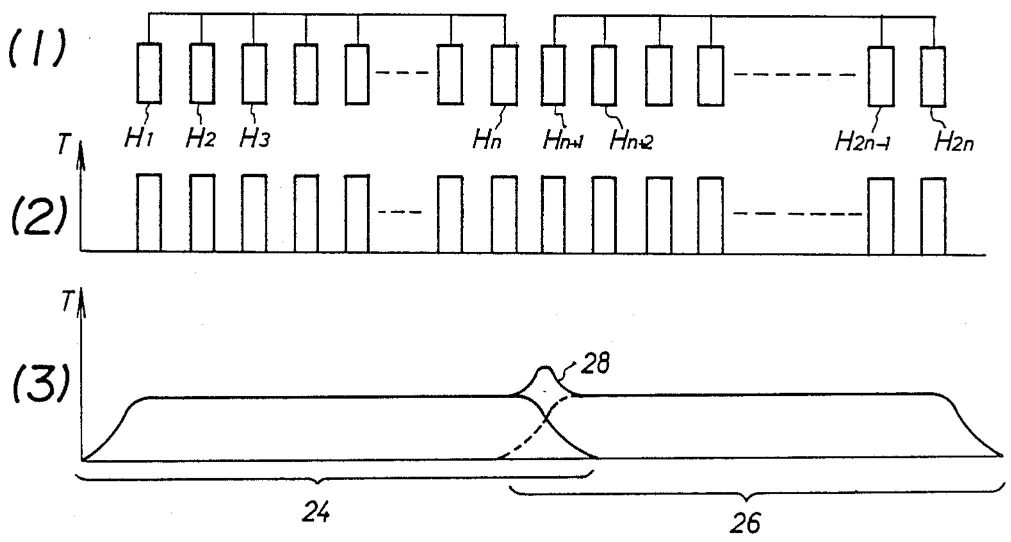
FIG. 6 shows a drawing for explaining the temperature distribution of the thermal head according to the conventional technique.

For the sake of clarifying the difference between the above-stated embodiment and the conventional technique, the operation of the conventional technique will be briefly described below with reference to FIGS. 5 and 6. In the conventional technique, the thermal resistance elements arranged in a line are separated into two equal sections in the middle. The first and second halves are specified by the block 1 ($H_1$ through $H_n$ in FIG. 6 (1)) and the block 2 ($H_{n+1}$ through $H_{2n}$ in FIG. 6 (1)), respectively. As shown in FIG. 5, the printing of all the levels of "0" through "64" is first performed for the block 1, then the printing of all the levels of "0" through "64" is performed for the block 2.

Such conventional technique, however, causes the following problems as stated before. For easily understanding, in the event that the printing over the whole image recording area with the uniform density, the temperature distribution in the longitudinal direction of the thermal head immediately after the pulses have been applied to all thermal resistance elements is shown in FIG. 6 (2) and its temperature distribution is unified in the longitudinal direction with time. Therefore, at the time of the completion of the printing through the block 1, the temperature distribution has a curve, as shown in FIG. 6 (3), which is uniform in the longitudinal direction and gradually falls at both ends of the block 1. Under this state, the temperature distribution represented by a curve 26 is obtainable at the portion of the block 2 by the printing through the block 2. Here, if the portion of the block 1 is sufficiently cooled, the left end of the distribution 26 should gradually fall as shown by the dotted line. However, since the temperature of the boundary portion between the blocks 1 and 2 becomes higher that of the other portion as shown by the distribution 28, the density of the portion corresponding to the boundary portion of the blocks becomes higher than that of the other portion, resulting in a failure of the uniform density recording. Although the above case concerns the recording over the whole image region with the uniform density, the foregoing pheriomena is generally caused and the boundary portion of the blocks is apt to increase in density for the usual image recording. This is caused even if the number of the blocks is larger than or equal to three.

On the contrary, according to this embodiment the blocks 1 and 2 respectively have the separated thermal resistance elements of the arrangements of the odd numbers and the even numbers and during the printing the thermal resistance elements of the odd numbers and even numbers are alternatively used, thereby unifying the temperature distribution in the longitudinal direction of the thermal head and eliminating the excessive distribution variation causing the patched density.

In the embodiment stated before, the blocks 1 and 2 are comprised of the thermal resistance elements of the odd numbers and even numbers, respectively. The separation of the thermal resistance elements into the blocks is, however, not limited to this case. For instance, as described referring to FIG. 6, the separation may be made by specifying the "$H_1$" through "$H_n$" thermal resistance elements as the block 1 and the remainder as the block 2, or by other separation method of the blocks 1 and 2 such that sets of a number larger than two of the thermal resistance elements are alternatively arranged.

Figure 7:
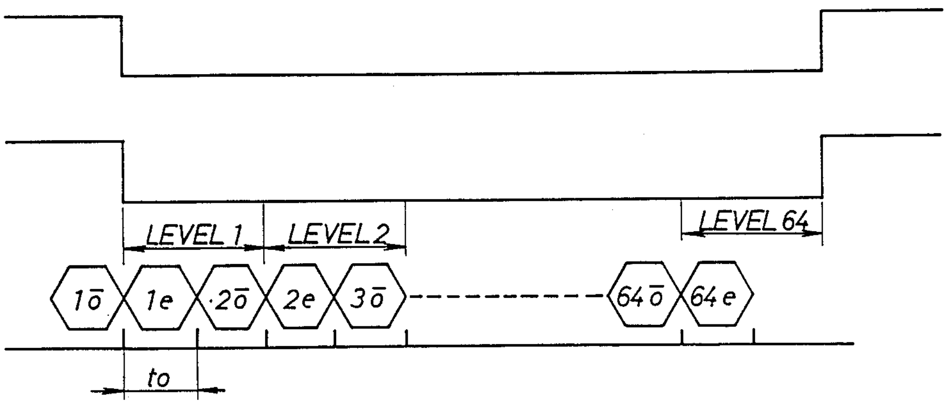
FIG. 7 shows a timing chart for explaining the operation of another embodiment according to the present invention.

When the thermal resistance elements are not separated into the two blocks of the odd and even numbers, the following construction may be enough for operation. As shown in FIG. 7, the data conversion section 20 generates for each density level odd effective data "1*o*, 2*o*, 3*o*, . . . , 64*o*" to be applied to the thermal resistance elements of the odd numbers and even effective data "1*e*, 2*e*, 3*e*, . . . , 64*e*" to be applied to the thermal resistance elements of the even numbers with adjusting the timing of the selection signals for the blocks 1 and 2, and the above data are alternatively transmitted at the latch timing "$t_0$" in the order of "1*o*, 1*e*, 2*o*, 2*e*, 3*o*, 3*e*, . . . , 64*o*, 64*e*".

Many widely different embodiments of the present invention may be constructed without departing from the spirit and scope of the present invention. It should be understood that the present invention is not limited to the specific embodiments described in this specification, except as defined in the appended claims.

What is claimed is:

1. A method of driving a thermal head in a printing device, said thermal head having a plurality of thermal resistance elements arranged in one line, each of said thermal resistance elements capable of being energized by heating pulses the number of which is controlled in accordance with the required density of a corresponding picture element, said method comprising the steps of:

electrically and alternately separating said thermal resistance elements into first blocks and second blocks so that the odd arranged elements and the even arranged elements of said plurality of thermal resistance elements are separated into said first blocks and second blocks, respectively;

simultaneously applying a heating pulse to all the necessary thermal resistance elements separated in the first block;

simultaneously applying a heating pulse to all the necessary thermal resistance elements separated in the second block; and alternately repeating said two applying steps in sequence until the respective numbers of the heating pulses are applied to each of the thermal resistance elements so as to obtain the required density.

2. A method as claimed in claim 1, where in said repeating step comprises a step of repeating said two applying steps in sequence by a predetermined number of corresponding to the maximum density for printing.

3. A method as claimed in claim 1, wherein said separating step comprises a step of alternately applying selection signals to the odd arranged elements and the even arranged elements.

* * * * *